United States Patent [19]

Geczy

[11] Patent Number: 4,657,090

[45] Date of Patent: Apr. 14, 1987

[54] TAPERED FRICTION BEARING ASSEMBLY

[75] Inventor: Bela Geczy, Orange, Calif.

[73] Assignee: Smith International, Inc., Irvine, Calif.

[21] Appl. No.: 823,344

[22] Filed: Jan. 28, 1986

[51] Int. Cl.$^4$ .......................... E21B 4/02; F16C 17/10
[52] U.S. Cl. ...................................... 175/92; 175/107; 384/271
[58] Field of Search .......................... 175/107, 92, 101; 415/502; 384/107–112, 420, 271, 272, 246

[56] References Cited

U.S. PATENT DOCUMENTS

| | | | |
|---|---|---|---|
| 2,919,960 | 1/1960 | Whitney | 384/108 |
| 3,391,965 | 7/1968 | Lindeboom | 384/110 |
| 3,484,143 | 12/1969 | Tallian et al. | 384/110 |
| 3,606,501 | 9/1971 | Waplington | 384/110 |
| 4,410,054 | 10/1983 | Nagel et al. | 175/107 |
| 4,518,049 | 5/1985 | Baldenka et al. | 175/107 |
| 4,546,836 | 10/1985 | Dennis et al. | 175/107 |

FOREIGN PATENT DOCUMENTS

| | | | |
|---|---|---|---|
| 620490 | 5/1961 | Canada | 175/107 |
| 1171398 | 1/1959 | France | 175/107 |
| 1143960 | 2/1969 | United Kingdom | 384/108 |

Primary Examiner—James A. Leppink
Assistant Examiner—Hoang C. Dang
Attorney, Agent, or Firm—Price, Gess & Ubell

[57] ABSTRACT

A bearing structure including first and second tapered bearing surfaces for accommodating on-bottom and off-bottom thrust and radial forces on a drive shaft in a down hole drilling environment and further including a radial bearing mounted between the first and second tapered bearings for restricting bending of the drive shaft.

5 Claims, 2 Drawing Figures

U.S. Patent    Apr. 14, 1987    4,657,090
FIG. 1
PRIOR ART
FIG. 2
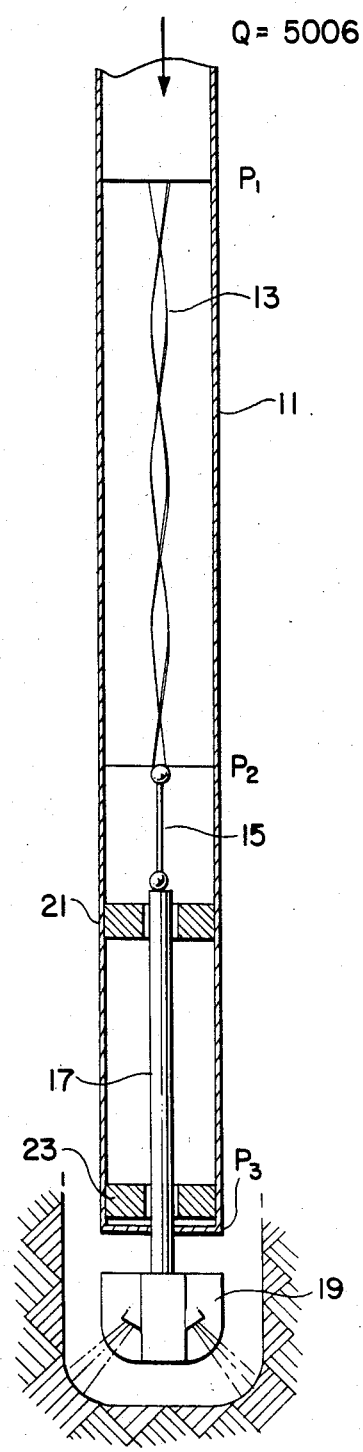
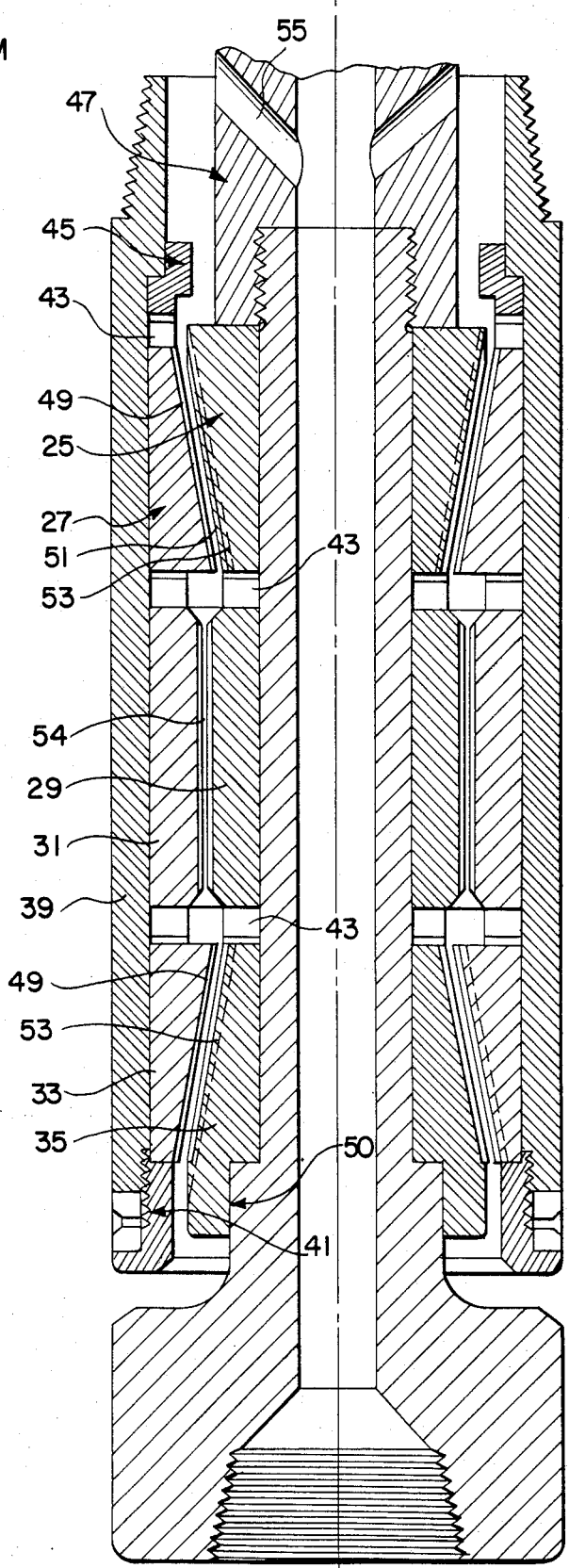

TAPERED FRICTION BEARING ASSEMBLY

The subject invention pertains generally to drilling tools and more particularly to a bearing assembly for accomodating the forces generated in a down hole motor used for example, in the oil drilling arts.

The design of bearing assemblies which will withstand the hostile environments and force loads typically encountered in down hole well drilling present a continuing challenge to the industry. The extremely high temperatures encountered preclude the successful application of sealed bearing technology as it currently exists. Thus, the prior art has turned to bearing structures exposed to the drilling fluids passing through the motor.

In the prior art, a pair of bearings have typically been provided to accomodate the drive shaft and attendant forces thereon. The bearings have been separated such that one bearing accomodates radial forces only and the second accomodates thrust loads only. Typical bearing materials have included poly-crystalline diamonds, ceramics, and tungsten carbide matrix.

It has appeared desirable to the inventor to improve over the prior art bearing structures in order to extend the lifetime of bearings in such apparatus.

SUMMARY OF THE INVENTION

It is therefore an object of the invention to provide an improved bearing structure.

It is another object of the invention to provide a bearing structure capable of handling both the radial and thrust loads created in a down hole motor.

It is yet another object of the invention to provide a bearing assembly with a longer life than those currently available in the state of the art.

These and other objects are achieved by a bearing assembly having tapered or canted bearing surfaces which absorb both radial and thrust loads. The design provides for a certain amount of fluid flow through the bearing structure with a central radial bearing serving to restrict fluid flow and to eliminate drive shaft deformation in the preferred embodiment.

BRIEF DESCRIPTION OF THE DRAWINGS

The preferred embodiment for implementing the just summarized invention will now be described in conjunction with the drawings of which:

FIG. 1 is a diagramatic illustration of a down hole drill motor according to the prior art;

FIG. 2 is a cross sectional drawing illustrating the preferred embodiment of the invention.

DETAILED DESCRIPTION OF THE PREFERRED EMBODIMENT

FIG. 1 illustrates a prior art down hole motor structure wherein the preferred embodiment finds application. As known in the art, the structure includes a progressive cavity motor 13, a coupling 15, a drive shaft 17, and a drill bit 19. The drive shaft 17 is born by a bearing assembly comprising bearings 21 and 23. Typically one of these bearings is a radial bearing and the other is a thrust bearing. In the structure of FIG. 1, a radial force arise from the eccentric motion of the coupling 15 as it is driven by a progressive cavity motor and from the drilling force on the drill bit 19. Thrust forces are generated for example by the pressure differential between points P2 and P3 in FIG. 1. The pressure differential across the bearing assembly is for example, on the order of 200 to 2,000 pounds per square inch (PSI).

FIG. 2 illustrates the preferred embodiment of a tapered friction bearing assembly. The assembly includes an off-bottom thrust and radial bearing 25, 27; a flow restrictor radial bearing 29, 31; and an on-bottom thrust and radial bearing 33 and 35. Each inner bearing element 25, 29, 35, is attached to the drive shaft 17 of the down hole motor. The outer bearing elements 27, 31, 33 are attached to a housing 39 which is threadably connected to a bottom nut 41. Locks 43 and a lock ring 45 serve to attach the bearings. The inner bearing elements 25, 29, and 35 are further held in position by a shaft cap 47 and are locked to the drive shaft 17 by the eccentric lock surface 50.

The opposing bearing surfaces 49 may be of any suitable bearing surface construction. Such constructions include poly-crystalline diamond, ceramic and tungsten carbide matrix. Flow grooves 53 are formed in the surfaces 49, 51. These grooves 53 have a width selected to provide sufficient flow of drilling fluid ("mud") to cool and lubricate the bearings. The flow gap 54 between the middle radial bearing elements 29, 31 determines the maximum flow possible. Sufficient pressure drop across the bearings, on the order of minimum 200 PSI, is required to assure sufficient flow of cooling fluid.

In operation, the off-bottom thrust and radial bearing 25, 27 accomodates the forces on the drive shaft 17 when the drive shaft is driven while the drill bit 19 is off-bottom, i.e. disengaged from a drilling operation. The on-bottom thrust and radial bearing 33, 35 accomodates the forces on the drive shaft 17 when the drill bit 19 is on-bottom, engaged in a drilling operation. The radial bearing 29, 31 serves to prevent bending of the drive shaft 17 which would otherwise occur as a result of the varying force pattern to which the drive shaft 17 is exposed. Prevention of bending increases the fatigue lifetime of the system.

The angle of the taper of the bearing elements 25, 27 is determined by the angle with respect to vertical of the resultant force vector on the drive shaft 17 in the off-bottom position. Similarly, the angle of the on-bottom thrust and radial bearing 33, 35 with respect to vertical is determined to match the angle of the resultant force vector typically expected to be experienced by the drive shaft 17 in its running, on-bottom mode. It will be observed that the drive shaft 17 will ride up or down with respect to the housing 39, depending on whether the drill string is in the off-bottom or on-bottom mode and otherwise in response to the forces experienced by the drive shaft 17. The optimum force balance of course if where the drilling parameters are such that the bearings are required to carry no load, i.e. where the drive shaft "floats."

The structure just described thus accomodates both radial and thrust forces, while preventing bending of the drive shaft 17. The structure is usable in a wide variety of applications including both turbine driven and progressive cavity down hole motors. As will be appreciated, the just described preferred embodiment is susceptible to numerous modifications and adaptations without departing from the scope and spirit of the invention. Therefore, it is to be understood, that within the scope of the appended claims, the invention may be practiced other than as specifically described herein.

What is claimed is:

1. A drive assembly comprising:

a housing means;

a drive shaft positioned within said housing means;

an upper frusto-conical bearing means for mounting said drive shaft with respect to said housing means and for absorbing both thrust and radial loads;

a radial bearing means positioned adjacent and below said upper bearing means for restricting bending of said drive shaft;

a lower frusto-conical bearing means positioned below and adjacent said radial bearing means for mounting said drive shaft with respect to said housing means and for absorbing both thrust and radial loads; and the upper bearing means, radial bearing means, and lower bearing means further providing a continuous downward cooling fluid flow path of circular cross section therethrough, the radial bearing means further comprising means for regulating said fluid flow.

2. The drive assembly of claim 1 wherein said drive shaft and housing means form part of a downhole drilling motor and wherein said upper, radial, and lower bearing means comprise the only bearing means for mounting said drive shaft with respect to said housing.

3. A drive assembly comprising:

a housing means;

a drive shaft positioned within said housing means;

an upper bearing means for absorbing both radial and thrust forces, said upper bearing means including:

a first upper bearing element mounted on said drive shaft and having an exterior frusto-conical bearing surface of a first selected taper;

a second upper bearing element on said housing means opposite said first upper bearing element and having an interior frusto-conical opening therein with the same taper as that of said first upper bearing element;

a radial bearing means for restricting bending of said drive shaft; said radial bearing means including:

a first radial bearing element mounted on said drive shaft below and adjacent to said first upper element and providing a first cylindrical radial bearing surface;

a second radial bearing element mounted on said housing means below and adjacent to said second upper element and providing a cylindrical radial bearing surface opposite said first cylindrical radial bearing surface;

a lower bearing means for absorbing both radial and thrust forces, said lower bearing means including:

a first lower bearing element mounted on said drive shaft and having an exterior frusto-conical bearing surface of second selected taper;

a second lower bearing element mounted on said housing means opposite said first lower bearing element and having an interior frusto-conical opening of the same taper as said first lower bearing element; and the upper bearing means, radial bearing means, and lower bearing means providing a continuous cooling fluid flow path of circular cross section between the bearing elements on said housing means and the bearing elements mounted on said drive shaft, the radial bearing means further regulating the flow of said cooling fluid.

4. The drive assembly of claim 3 wherein said drive shaft and housing means form part of a downhole drilling motor and wherein said upper, radial, and lower bearing means comprise the only bearing means for mounting said drive shaft with respect to said housing.

5. The drive assembly of claim 3 wherein said continuous fluid flow path comprises a substantially continuous bearing surface.

* * * * *